United States Patent [19]
Dalli

[11] 4,082,674
[45] Apr. 4, 1978

[54] BUOY TYPE OIL GATE

[76] Inventor: Francis J. Dalli, Old Bedford Rd., Lincoln, Mass. 01773

[21] Appl. No.: 681,981

[22] Filed: Apr. 30, 1976

[51] Int. Cl.$^2$ .............................................. B01D 17/02
[52] U.S. Cl. .................................. 210/242 S; 61/1 F; 210/DIG. 25
[58] Field of Search ................... 61/1 F, 28; 210/154, 210/242 S, DIG. 25

[56] References Cited
U.S. PATENT DOCUMENTS

| | | | |
|---|---|---|---|
| 1,397,892 | 11/1921 | Jones | 210/242 S X |
| 3,818,708 | 6/1974 | Benson | 61/1 F |
| 3,834,538 | 9/1974 | Laman | 210/242 S X |

Primary Examiner—Frank A. Spear, Jr.
Assistant Examiner—Richard W. Burks
Attorney, Agent, or Firm—Joseph E. Rusz; Sherman H. Goldman

[57] ABSTRACT

For use in a body of water having variable levels, means sealing channels to the banks of said body of water, and floatable means extending across said body of water and into said channels capable of holding back petroleum products and other floatable debris released upstream into said body of water.

6 Claims, 5 Drawing Figures

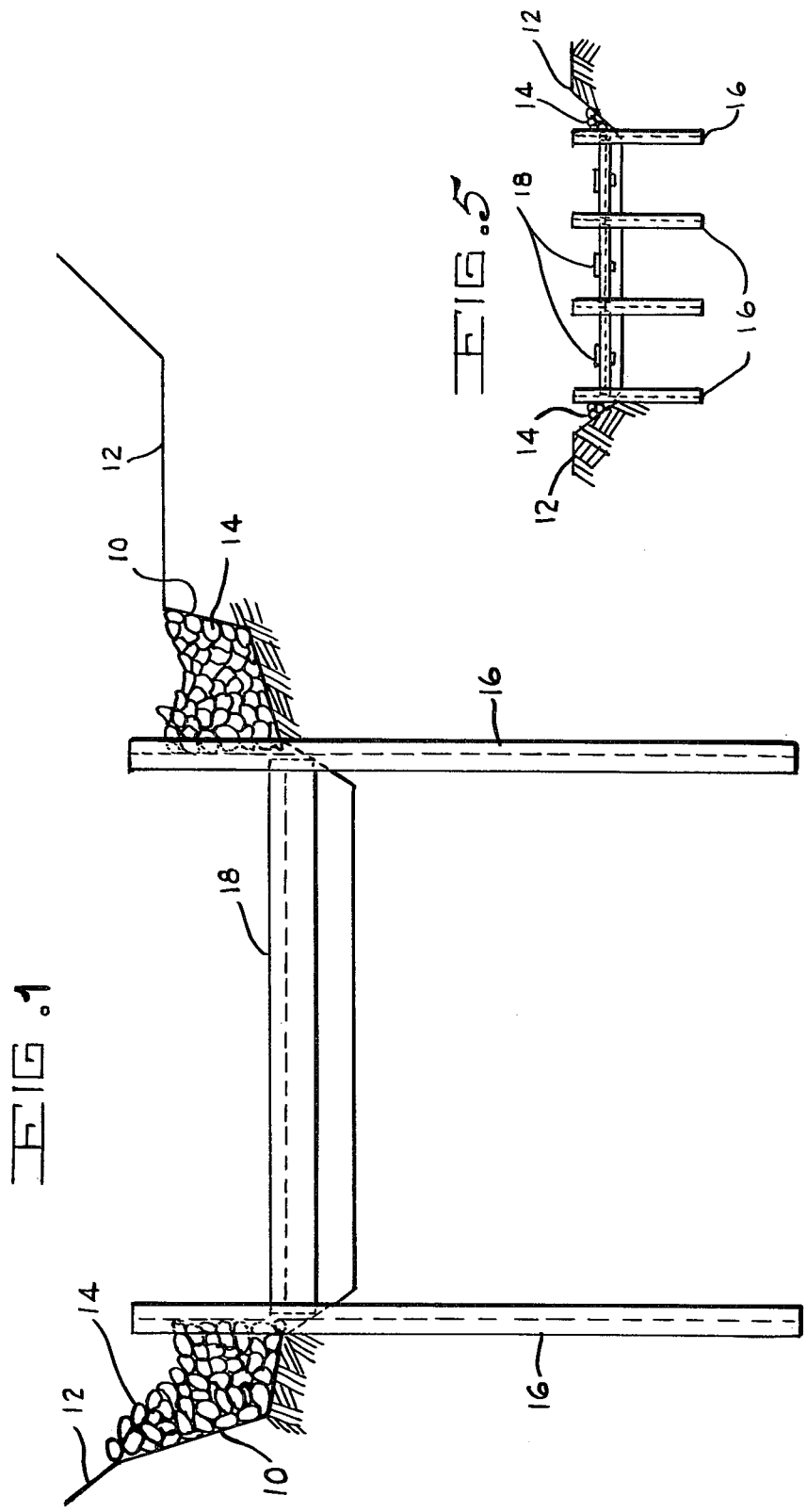

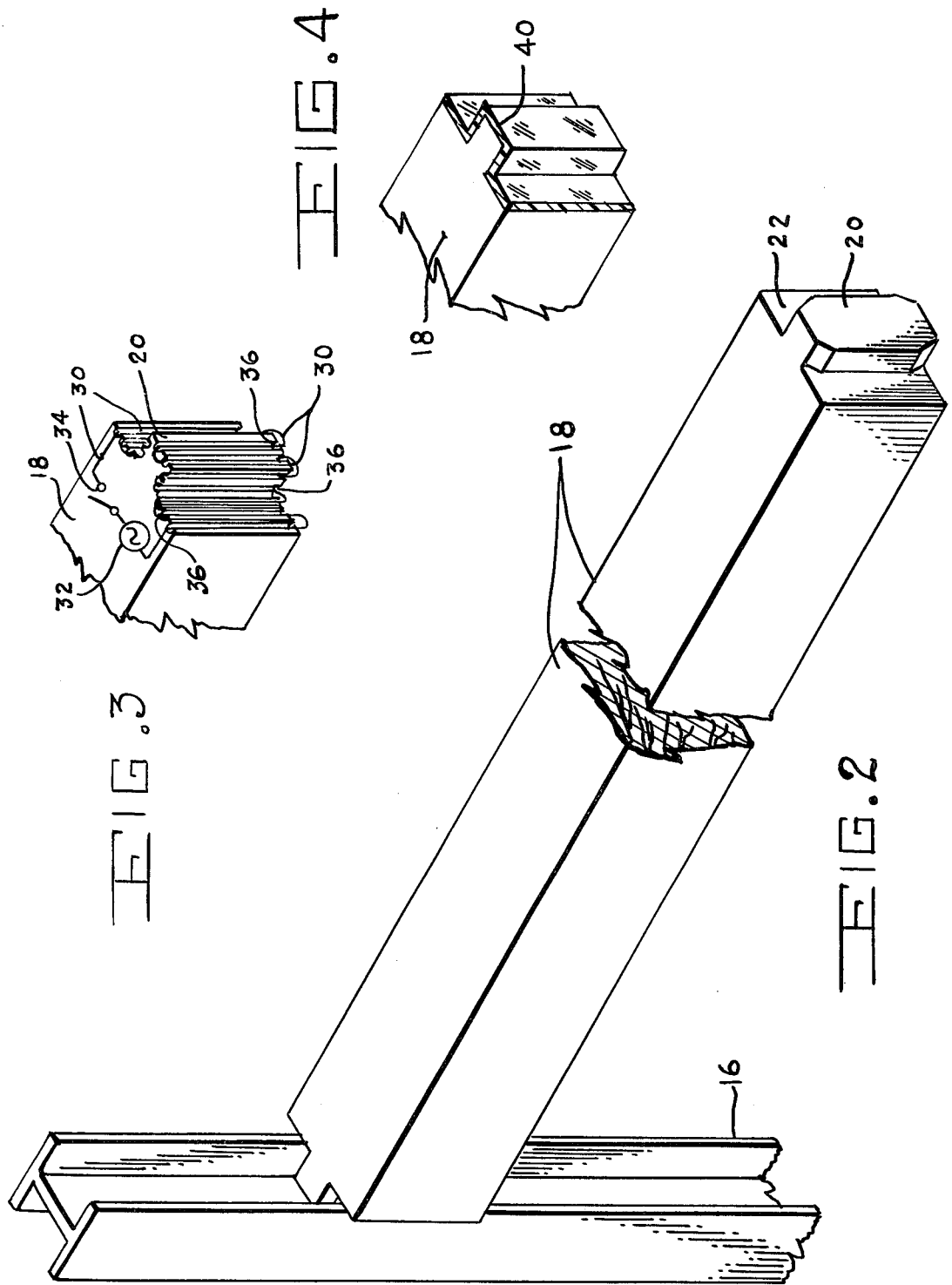

4,082,674

BUOY TYPE OIL GATE

STATEMENT OF GOVERNMENT INTEREST

The invention described herein may be manufactured and used by or for the Government for governmental purposes without the payment of any royalty thereon.

BACKGROUND OF THE INVENTION

This invention relates generally to an arrangement for preventing the pollution of a body of water having variable levels and more particularly to a buoy type oil gate which holds back pollutant products. Previously, oil spills into a stream of water having variable flow and, therefore, variable water levels, involved the use of high priced oil separators through which the flow of water was made to pass. In addition to expensive equipment costs required for an oil separator system, a requirement exists for much costly manpower and maintenance for effective operation. The high costs have inhibited adoption of ecological control systems because of the economic impact of high cost maintenance and equipment on the industries causing the pollution. My invention avoids the high costs attendant to prior art water pollutant control systems.

SUMMARY OF THE INVENTION

The invention relates to a buoy type oil gate which straddles a stream having variable water levels. The gate is arranged to float such that it has an area extended above the water level and has ends which ride in and seal to channels proximate to the banks of a stream.

Accordingly, it is a primary object of this invention to provide a buoy type oil gate which floats on the surface of a body of water and rides up and down within a pair of channels such that it has the capability of holding back oil from passing downstream of said gate.

It is another object of this invention to provide a buoy type gate having the gate portion of polyurethane coated timber.

It is still another object of this invention to provide a buoy type oil gate which rides in guide means located at the sides of a body of water having variable levels.

It is a further object of this invention to provide a series of buoy type oil gates for controlling the spread of petroleum and other floatable pollutants downstream of the location of the gates.

It is a still further object of this invention to provide a buoy type oil gate which is easy and economical to produce of standard, conventional, currently available materials that lend themselves to conventional manufacturing techniques.

Another object of this invention is to provide a passive control system for holding back pollutants in a stream without damming the stream.

These and other advantages, features and objects of the invention will become more apparent from the following description taken in connection with the illustrative embodiments in the accompanying drawings.

BRIEF DESCRIPTION OF THE DRAWINGS

FIG. 1 is a cross section across a creek or river bed illustrating the positioning of the parts forming the buoy type gate of this invention;

FIG. 2 is a pictorial representation of a channel and the gate member of this invention;

FIGS. 3 and 4 are alternative embodiments for the ends of the gate member; and

FIG. 5 is a schematic illustration of a series of gates which may be utilized for wider body of water.

DESCRIPTION OF THE PREFERRED EMBODIMENTS

Referring to the Figures there is shown a device for holding back contaminants which float upon a body of water and more particularly one which has variable levels due, for example, to the effects of rainy seasons, etc. In order to perform the invention as best illustrated in FIG. 1 a hole is excavated at 10 into the bank 12 of a brook or river and filled with fieldstone 14. At the builders option, cement or cemented fieldstone may be utilized. A channel 16 is placed at each side of the stream and abuts the fieldstone such that the channel now seals the water from going around the system of the invention. A coated timber 18 is placed across the body of water and is installed such that it floats thereon with a portion below the water level and a portion above. The timber gate is constrained by the engagement of the ends thereof with the channels 16. The channel members 16 may be of a conventional U-shaped construction or I-beam construction, as illustrated in FIG. 2, and would be driven into the ground or bed of the stream for a number of feet and would extend above the flood level of said stream.

The ends of the timber 18 are trimmed, as illustrated at 20 in FIG. 2, to fit loosely within a channel 16 of the I-beam. The corners are rounded or beveled as at 22 in order to minimize the amount of friction and to allow free movement of the timber to follow the level of the stream. The loose fit and beveling is to reduce the friction and allow for free movement with the stream thereby avoiding a seizing of the gate to the channel by pollutents or snow and ice. A polyurethane coating is applied to the timber to seal it and provide for extended life.

The height of the gate timber 18 should be sufficient to hold back pollutants and debris that might possibly be carried over the timber if they should impinge against it with any appreciable amount of momentum.

FIG. 3 illustrates an alternative embodiment of the end 20 of the timber 18. Here a wire 30 is applied to the end portion engaged by the channel 16. The wire is of the heating element type, for example, of nichrome, and is connected to a source 32 and a switch 34 in series therewith to allow for a closure of the circuit and a heating of the wire. This avoids a seizing of the timber in the channel by melting ice during the winter that would not allow the gate timber 18 to follow the level of the stream. The wire could also run lengthwise from end to end along the timber 18 in order to assure freedom of the entire gate from ice. The wire may be embedded in grooves 36 in the timber in order to avoid having them short circuit against the metal of the channel member 16.

The avoidance of seizing at channel 16 may also be controlled by means of a teflon coating 40 applied to the ends of the gate 18, as illustrated in FIG. 4, thereby minimizing friction and providing a surface to which ice does not readily adhere.

The invention thus far described can also be utilized for large spans for large bodies of water and would have the system illustrated in FIG. 5 applied thereto. In this instance a series of gates 18 are formed and connected to a number of I-beam type channels 16 to straddle the stream.

STATEMENT OF OPERATION

With the buoy type gate or gates, previously described, installed across a stream, the gate timber 18 would float on the water and the pressure of the stream flow would cause the timber to seal across the downstream portion of the interior of the channels 16. Pollutants such as oil or gasoline and other contaminants which float on water would be held back by the timber. The same type of operation would occur with multiple gates straddling a single stream. At intervals personnel would take a pump to skim the contaminants off the top of the water and keep the system in operation. Additional timbers 18 could be stacked to form a higher gate thereby cutting down on the frequency of pollutant removal. Also, in place of the vertical orientation illustrated the channels 16 could be tilted in a downstream direction in order to assure smooth operation of the system by minimizing frictional forces.

Although the invention has been described with reference to particular embodiments, it will be understood to those skilled in the art that the invention is capable of a variety of alternative embodiments within the spirit and scope of the appended claims. For example, the gate portion need not be of wood but may be of any material or construction that floats.

I claim:

1. A buoy type oil gate for a body of water channeled at its sides and bottom and having variable levels and flow comprising
    channel means secured at the sides of the body of water, and
    floatable means extending thereacross into said channel means and also extending above and below the surface of said body of water,
    the ends of said floatable means in engagement with said channel means having the downstream portion thereof in a sealing engagement over an area with said channel means due to the pressure of the flow of said stream against said floatable means, said ends being trimmed to reduce friction in said channels for facile movement in the vertical plane while inhibiting freezing of said floatable means to said channels.

2. A gate as defined in claim 1 including means secured to said ends of said floatable means for inhibiting the adherence of ice.

3. A gate as defined in claim 2 wherein said last-mentioned means comprises polytetrafluorothylene.

4. A gate as defined in claim 2 wherein said last-mentioned means comprises heating means.

5. A gate as defined in claim 4 wherein said heating means is recessed in the said ends.

6. A gate as defined in claim 1 wherein said channels are tilted in a downstream direction.

* * * * *